(12) United States Patent
Clavier et al.

(10) Patent No.: US 10,813,369 B2
(45) Date of Patent: Oct. 27, 2020

(54) APPARATUS AND METHOD FOR AERATION OF A FOOD PRODUCT

(71) Applicant: NESTEC S.A., Vevey (CH)

(72) Inventors: Luis Clavier, Lisieux (FR); Jean-Francois Chevalier, Courtonne la Meurdrac (FR); Rafael Marcilla, Lisieux (FR)

(73) Assignee: Societe des Produits Nestle S.A., Vevey (CH)

( * ) Notice: Subject to any disclaimer, the term of this patent is extended or adjusted under 35 U.S.C. 154(b) by 3 days.

(21) Appl. No.: 15/768,094

(22) PCT Filed: Oct. 19, 2016

(86) PCT No.: PCT/EP2016/075050
§ 371 (c)(1),
(2) Date: Apr. 13, 2018

(87) PCT Pub. No.: WO2017/067965
PCT Pub. Date: Apr. 27, 2017

(65) Prior Publication Data
US 2018/0295854 A1    Oct. 18, 2018

(30) Foreign Application Priority Data

Oct. 19, 2015  (EP) .................................. 15190428

(51) Int. Cl.
*A23G 3/52* (2006.01)
*A23G 3/50* (2006.01)
(Continued)

(52) U.S. Cl.
CPC ............ *A23G 3/0221* (2013.01); *A23G 1/003* (2013.01); *A23G 3/0012* (2013.01); *A23G 3/52* (2013.01);
(Continued)

(58) Field of Classification Search
None
See application file for complete search history.

(56) References Cited

U.S. PATENT DOCUMENTS 3,610,540 A * 10/1971 Krolopp .................. A47J 42/44
                                                          241/2
4,281,937 A *  8/1981 Ferri .................... B01F 13/1016
                                                         366/303
(Continued)

FOREIGN PATENT DOCUMENTS

DE      29709060     9/1997
NL       1009069    11/1999
WO     2013068426     5/2013

*Primary Examiner* — Ibrahime A Abraham
*Assistant Examiner* — Gyounghyun Bae
(74) *Attorney, Agent, or Firm* — K&L Gates LLP

(57) ABSTRACT

An apparatus (300) for aerating a food product, (200, 300) comprising a housing (10) with an inlet (100) for the food product and an outlet for the aerated food product, and, within the housing (10), first and second pairs (210, 220, 240) of a rotor and a stator each having complementary toothed rims orientated in opposition in the axial direction, and a gas injector (1) for injecting, at an upstream position relative to the first pair (210, 220) of a rotor and a stator, a gas in the food product to be aerated, wherein a further inlet (310) is provided for injecting, at a position between a pair (210, 220) and an adjacent pair (240) of a rotor and a stator, an additional composition to be mixed with the food product.

13 Claims, 2 Drawing Sheets

(51) Int. Cl.
  *A23G 9/20* (2006.01)
  *A23G 3/02* (2006.01)
  *A23G 1/00* (2006.01)
  *A23G 3/34* (2006.01)
  *A23P 30/40* (2016.01)
  *A23G 9/46* (2006.01)

(52) U.S. Cl.
  CPC ................. *A23G 9/20* (2013.01); *A23G 9/46* (2013.01); *A23P 30/40* (2016.08); *A23G 2220/02* (2013.01)

(56) References Cited

U.S. PATENT DOCUMENTS

| | | | | |
|---|---|---|---|---|
| 4,418,089 A * | 11/1983 | Bouette | ................. | A23G 1/105 366/149 |
| 5,273,188 A * | 12/1993 | Sanino | ................... | G01F 11/44 222/195 |
| 5,470,153 A * | 11/1995 | De Naeghel | ............ | B01F 7/008 366/303 |
| 5,563,189 A * | 10/1996 | Hosokawa | ............ | B01F 3/0853 523/322 |
| 5,632,596 A * | 5/1997 | Ross | ................... | B01F 7/00758 241/261 |
| 5,904,308 A * | 5/1999 | Schnell | ............... | B01F 7/00758 241/188.2 |
| 5,971,307 A * | 10/1999 | Davenport | ................ | B02C 7/04 241/259.1 |
| 6,458,241 B1 * | 10/2002 | Doelle | .................. | B01F 3/0446 162/181.2 |
| 6,502,980 B1 * | 1/2003 | Ekstrom | ............... | B01F 5/0682 366/305 |
| 6,638,556 B1 * | 10/2003 | Desai | .................... | A23G 9/322 426/115 |
| 6,648,500 B2 * | 11/2003 | Fedorov | ................. | B01F 7/008 366/285 |
| 7,390,163 B2 * | 6/2008 | Clauson | .................... | F01D 1/22 415/199.2 |
| 7,691,953 B2 * | 4/2010 | Hassan | ............... | B01F 7/00766 366/241 |
| 7,815,362 B2 * | 10/2010 | Myhrberg | ............. | B01F 3/0807 366/273 |
| 8,445,546 B2 * | 5/2013 | Wood | ................. | A61K 41/0004 516/10 |
| 8,834,016 B1 * | 9/2014 | Richie | .................. | B01F 5/0062 366/340 |
| 9,387,498 B2 * | 7/2016 | Hagata | .................... | B01F 5/104 |

* cited by examiner

APPARATUS AND METHOD FOR AERATION OF A FOOD PRODUCT

CROSS REFERENCE TO RELATED APPLICATIONS

The present application is a National Stage of International Application No. PCT/EP2016/075050, filed on Oct. 19, 2016, which claims priority to European Patent Application No. 15190428.1, filed on Oct. 19, 2015, the entire contents of which are being incorporated herein by reference.

FIELD OF THE INVENTION

The present invention relates to an apparatus for aeration of food products, and to a method for the aeration of food products.

BACKGROUND OF THE INVENTION

The most common industrially applied methods of aerating liquid and semi-liquids products are based on mechanical aeration. Examples of commercial machines for the aeration of food products currently available on the market are machines such as those made by Mondomix™. The commercially available machines vary somewhat in their design but the principles of their operation are generally similar. The mixing apparatus of the commercially available Mondomix™ machines is of the rotor-and-stator type mixing apparatus comprising a stainless steel rotor shaft covered with metal pegs which fit inside a housing that also has pegs inside of it. When assembled the pegs on the shaft and on the inside of the apparatus intermesh to provide shear force on the product flow. A liquid phase and a gas phase are merged before entering the mixing apparatus. The mixing apparatus mechanically disintegrates large gas bubbles into very small bubbles that are trapped within the food matrix. The bubble size is an essential factor that determines the product attributes. Such machines are described in WO 91/07221 A1, GB 888 264 A and DE 31 27 684 A1.

WO 2013/068426 A1 discloses a device for the aeration of food products comprising a mixing head having at least one set of rotor-stator combinations. Each rotor-stator combination comprises a rotor and a stator with complementary toothed rims which are orientated in opposition in the axial direction. An inlet cover is provided having a product inlet opening for receiving a product to be aerated and a gas injector arranged thereon and traversing the inlet cover such that the head of the gas injector is located in a headspace defined by the inlet cover and a first rotor-stator set. This device does not allow mixing and aerating several compositions together.

DE 297 09 060 U1 relates to a construction kit for constructing a device for the continuous dispersal and mixing of gases, fluids and/or solids in a fluid phase as a fluid matrix.

NL 1009069 C2 relates to a frothing device for the continuous frothing of liquid product, which frothing device is provided with a frothing chamber, to which an inlet is connected for the liquid product and an outlet for frothed product, wherein, additionally, a feed is provided for gas or air, with which the liquid is mixed in the frothing device to form the frothed product, and wherein a pump is provided for the supply of the liquid product.

Disadvantages of the commercially available systems include limitations on the modularity of the apparatus, e.g. with respect to inlet of different fluids and/or the size of bubbles obtained amongst others.

Furthermore such systems are limited with respect to the homogeneous mixing and aeration of food products.

It is an object of the invention to provide an apparatus and method for the aeration of food products that overcomes one or more disadvantages of the known commercial systems.

It would be advantageous to provide an apparatus which is cost effective, flexible, compact, and applicable on an industrial scale.

It would be advantageous to provide an apparatus that can produce a stable, homogenous aeration of liquid or semi-liquid food products.

It would be further advantageous to provide an aerated edible product with inclusions of edible grains, chips or particles.

It would therefore also be advantageous to provide an apparatus which is capable of producing an aerated edible product with inclusions of edible grains, chips or particles.

SUMMARY OF THE INVENTION

The inventors have developed a substantially different apparatus and method to obtain aerated food products, particularly aerated food products, such as mousses, with inclusions of edible grains, chips or particles.

In one aspect there is provided an apparatus for aerating a food product comprising a housing with an inlet for the food product to be aerated and an outlet for the aerated food product, and, within the housing, a plurality of pairs of a rotor and a stator, where each pair of a rotor and a stator has complementary toothed rims orientated in opposition in the axial direction, and a gas injector for injecting, at an upstream position relative to the first pair of a rotor and a stator, a gas in the food product to be aerated, wherein a further inlet is provided for injecting, at a position between an upstream pair of a rotor and a stator and an adjacent downstream pair of a rotor and a stator, a liquid or semi-liquid flowable additional composition to be mixed with the food product. Advantageously, the injected additional composition will be mixed with the aerated product and chopped by the adjacent downstream pair of a rotor and a stator to form grains, chips or particles in the aerated product.

Advantageously the apparatus further comprises a jacket surrounding at least a portion of the tubular housing.

Advantageously the apparatus further comprises a back-pressure regulator arranged in the flow path of product downstream of the mixing apparatus.

The apparatus of the present invention makes it possible to produce a very homogenous distribution of gas in the product flow, and a uniform gas bubble distribution. Advantageously the configuration of the apparatus of the invention is very flexible and can be adjusted to produce aerated products with homogeneously small or large bubbles throughout the product. This has the advantage of giving a more stable aerated product, and for example for food products can allow a longer shelf-life and/or to reduce the amounts of certain stabilising ingredients in the food product.

The apparatus of the invention is cost efficient and suitable for industrial application, particularly in the aeration of foodstuffs. Advantageously the apparatus of the present invention permits simpler and more cost effective cleaning and sanitization process compared to conventional aeration apparatus. Advantageously, as described in more detail below, the apparatus of the invention is very flexible, for instance with respect to the injection of different fluids, different rates of fluid inlet, different working pressures, the range of product overrun obtainable, the size of gas bubbles obtained, amongst others.

In another aspect the invention provides a method of preparing an aerated food product comprising passing a stream of food product to be aerated through an apparatus according to the invention, injecting via the gas injector a gas into the food product stream at an upstream position relative to the first pair of a rotor and a stator, and injecting an additional composition to be mixed with the food product through the further inlet at a position between an upstream pair of a rotor and a stator and an adjacent downstream pair of a rotor and a stator, into an axial space provided between said upstream pair of a rotor and a stator and said adjacent downstream pair of a rotor and a stator.

These and other embodiments and potential advantages will be apparent in the following detailed description and drawings.

DETAILED DESCRIPTION

Figure 1:
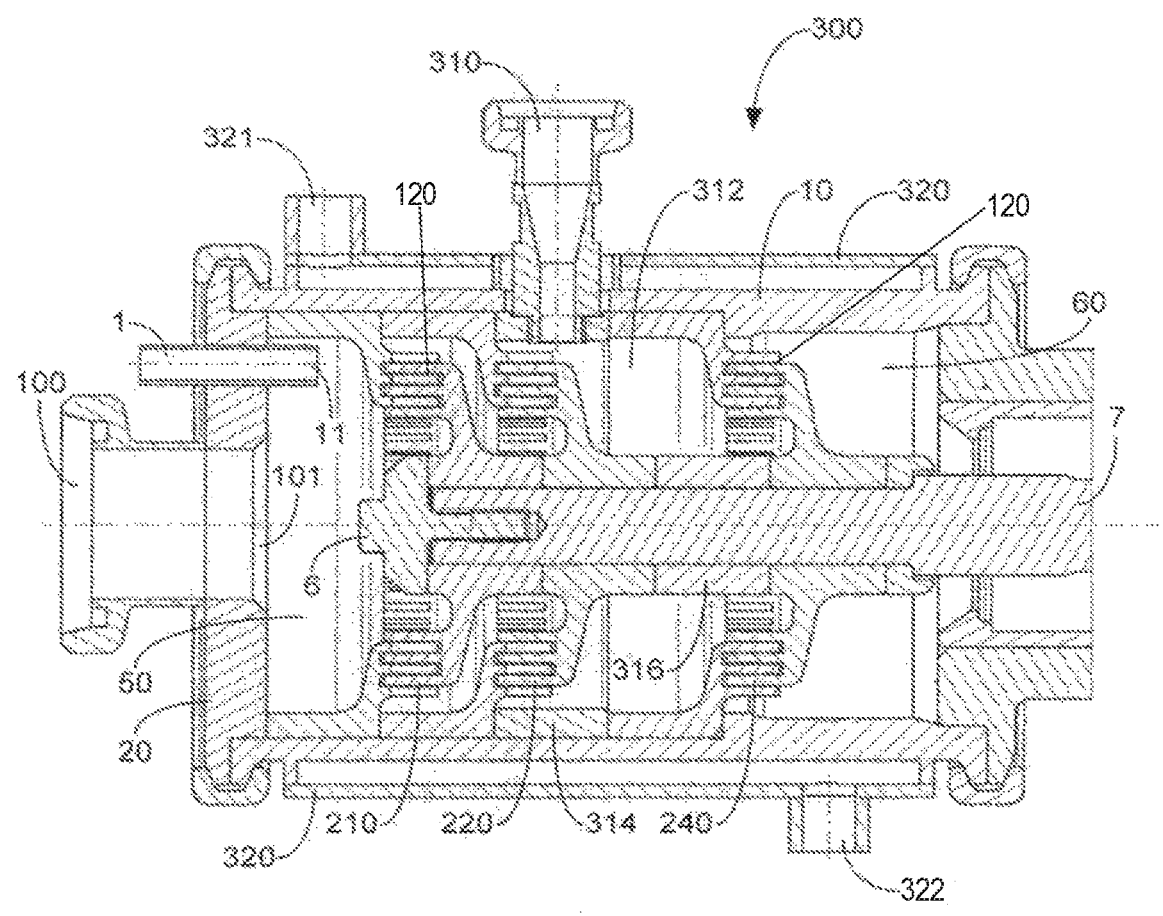
FIG. 1 shows a longitudinal cross section of an apparatus according to one embodiment of the invention.
Figure 2:
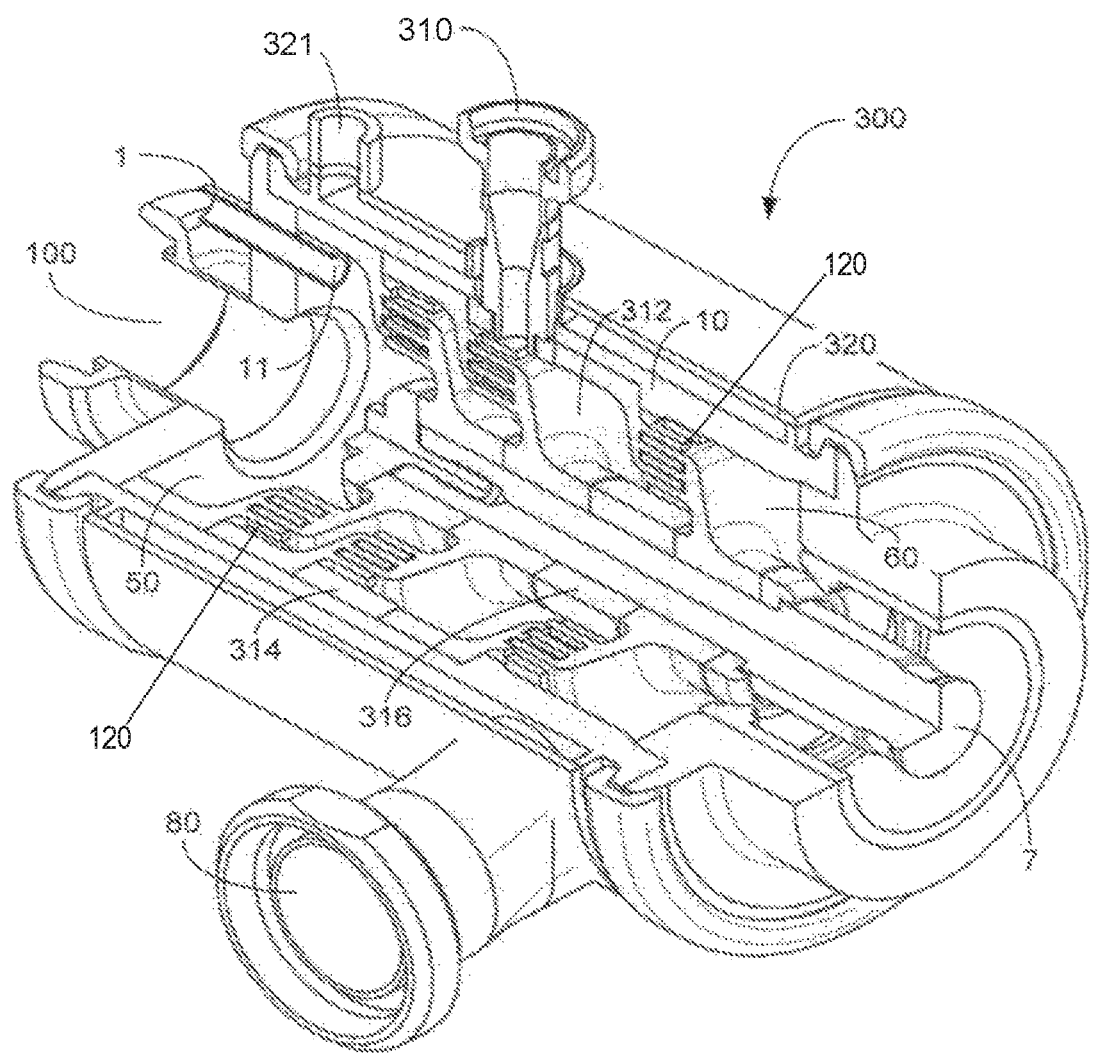
FIG. 2 shows a perspective view of the apparatus in FIG. 1.

Referring to FIGS. 1 and 2, there is presented a suitable mixing apparatus 300 according to one embodiment of the invention. The mixing apparatus 300 comprises a substantially tubular housing 10 in which are housed three stages or pairs of a rotor and a stator 210, 220, and 240. The pairs of a rotor and a stator 210, 220 and 240 are aligned in series along a central drive shaft 7.

Each pair of a rotor and a stator 210, 220 and 240 comprises a rotor and a corresponding stator. The rotors are coupled to the axial shaft 7 and rotatably driven around the central axis of the drive shaft by a motor drive (not shown) coupled to the shaft through the screw 6. The motor drive can be directly or indirectly coupled to the shaft 7. The direction of rotation may be clockwise or anti-clockwise about the central axis of the drive shaft. In the embodiment illustrated the stators are coupled to the internal wall of the cylindrical housing 10.

The rotors have one or more toothed rims 120 which engage with complementary toothed rims 120 on the stators and orientated in opposition in the axial direction. Each pair of a rotor and a stator 210, 220, 240 may comprise two or more rows of rotor and stator teeth. The number of rows of rotor and stator teeth on each rotor-and-stator stage 210, 220, 240 may vary along the mixing apparatus. In a particular embodiment the rotors and stators of all of the rotor-stator stages have the same number of sets of teeth. In preferred embodiments at least one rotor stator set comprises at least two rows of rotor-stator teeth; in another embodiment at least one rotor stator set comprises three rows of rotor-stator teeth, and in yet another embodiment at least one rotor stator set comprises four rows of rotor-stator teeth. In an embodiment, embodiments each rotor stator set comprises at least two rows of rotor-stator teeth; in another embodiment, each rotor stator set comprises three rows of rotor-stator teeth, and in yet another embodiment each rotor stator set comprises four rows of rotor-stator teeth.

The number, width and/or spacing between rotor teeth can vary between the rows of teeth on a particular rotor in a particular rotor/stator set. In a preferred embodiment the spacing between the teeth is substantially the same on a particular rotor. The number, width and/or spacing between stator teeth can vary between the rows of teeth on a particular stator depending on the food product to be aerated. In a preferred embodiment the spacing between the teeth is substantially the same on a particular stator. In preferred embodiments the complementary axially opposed teeth on the rotor and the stator of a particular rotor-and-stator set have corresponding number, width and spacing of the teeth. In embodiments, rotors comprise at least 10 rotor teeth circumferentially spaced about the circumference of each rotor. In embodiments, stators comprise more at least 10 stator teeth circumferentially spaced about the circumference of each stator.

The number, width and/or spacing of rotor/stator teeth can vary between the pairs of a rotor and a stator within a mixing apparatus. In embodiments each pair of a rotor and a stator has substantially the same number, width and/or spacing of rotor/stator teeth. Advantageously the external diameter of the toothed rims of each pair of a rotor and a stator is substantially the same. Advantageously the internal diameter of the toothed rims of each pair of a rotor and a stator is substantially the same.

In some embodiments the mixing apparatus comprises a plurality of pairs of a rotor and a stator. In certain embodiments the mixing apparatus comprises at least two pairs of a rotor and a stator. In certain embodiments the mixing apparatus comprises at least 3 rotor-stator pairs. Generally, the mixing apparatus contains no more than 8 rotor-stator pairs. In an embodiment, the mixing apparatus comprises at least three rotor-stator pairs, and up to eight rotor-stator pairs, including, as will be explained below, spacer rings when applicable. In some embodiments the mixing apparatus contains no more than 6 rotor-stator pairs. In certain embodiments the mixing apparatus comprises three rotor-stator pairs. In other embodiments the mixing apparatus comprises four rotor-stator pairs.

In some embodiments, each pair of a rotor and a stator is removable and interchangeable, offering flexibility. For instance different numbers, widths and spacing between the teeth of the rotor-stator toothed rims can therefore be changed as desired for at each pair of a rotor and a stator position within the mixing apparatus depending on the properties of the food product to be aerated and the desired aeration result.

The mixing apparatus 300 has a product inlet 100 in an inlet cover 20, configured for receiving a stream of a liquid or semi-liquid food product to be aerated from a product feed-line. In some embodiments the product inlet is located centrally in the inlet cover 20, along the axis of the shaft 7. A pump (not shown) may be used to inject the liquid or semi-liquid product into the mixing apparatus and through the series of pairs of a rotor and a stator.

A gas injector 1 is positioned in the inlet cover 20 for the introduction of gas under pressure into the mixing apparatus. In general, gas may be injected into the mixing apparatus under a pressure in the range of from about 0.5 bars to about 10 bars. The outlet tip 11 of the gas injector is located in a space 50 upstream relative to the pairs of a rotor and a stator of the mixing apparatus and thereby provides injection of the gas under pressure into the mixing apparatus near to the toothed rims 120 of the first pair 210 of a rotor and a stator. The position of the gas injector in the space 50 is important for providing an efficient incorporation of the gas into the product stream. Advantageously the tip 11 of the gas injector is positioned proximate the inner toothed rim of the first pair of a rotor and a stator, whereby gas injected through the injector 1 will contact the teeth of the pair of a rotor and a stator directly after injection, so that the gas flow is subjected to shear forces of the first pair 210 of a rotor and a stator on entry in to the apparatus. This has the effect of producing regular and uniform gas bubbles in the product stream, making it possible to produce a homogenous distribution of gas through the product with a narrow distribution of gas bubble size. Especially, the distance between the tip 11 of the gas injector and the inner toothed rim of the first pair of a rotor and a stator 210 is shorter than the distance between the aperture 101 of the product inlet 100 and the inner toothed rim of the first pair of a rotor and a stator 210.

In certain embodiments the inlet tip 11 of the gas injector is positioned at a distance of no more than 4 cm from the inner toothed rim of the first pair of a rotor and a stator. In some embodiments the inlet tip of the gas injector is located at a distance in the range of from about 0.1 cm to about 3 cm from the inner teeth of the first pair of a rotor and a stator, preferably at a distance in the range of from about 0.2 cm to about 2 cm, for instance at a distance in the range of from about 0.5 to about 1.5 cm.

The gas injector can be positioned with its central axis aligned at an angle of from 0° to about 85°, for example between 0° and 80° relative to the central axis of the mixing apparatus. In certain embodiments the gas injector is inclined relative to the central axis of the mixing apparatus, which permits to optimise the flow of the injected gas onto the teeth of the first pair of a rotor and a stator. The desired degree of inclination of the gas injector can be adjusted dependent on the location of the gas injector on the inlet cover, and the relative arrangement of the gas injector and the pairs of a rotor and a stator. For instance the central axis of the gas injector may be inclined at an angle of from about 5° to about 85° relative to the central axis of the mixing apparatus, preferably at an angle from about 10° to about 80°, for example about 10° to about 60°, for example at an angle of about 15° to about 45° relative to the central axis of the mixing apparatus, e.g. at an angle from about 15° to about 30°. In other embodiments the gas injector can be positioned with its central axis parallel to central axis and/or product inlet.

The position of injector head (tip) provides good control over the applied shearing and cutting forces and avoids the formation of gas pockets in the product stream. By having the injector 1 proximate the teeth of the first rotor/stator set provides a constant shear and cutting force on the injected gas on entry into the mixing apparatus ensuring a uniform distribution of the gas into the body of the mixing apparatus and into the rest of the series of rotor/stator sets. In this way the mixing apparatus provides an efficient incorporation of gas into the product stream, and advantageously produces a very homogenous distribution of gas within the product stream at the outlet, with a substantially uniform gas bubble size.

More than one gas injector can be provided positioned in the inlet cover. In some embodiments two gas injectors are used, in other embodiments three gas injectors can be used.

In some embodiments all rotor-and-stator sets in the mixing apparatus 300 have the same internal and external diameter and are positioned aligned in series along the shaft 7 centred on the same central axis. This aligned configuration permits control on the shear and cutting forces applied along the mixing apparatus and importantly allows controlling a substantially constant flow rate of product through the mixing apparatus, making it possible to maintain an advantageously uniform and small gas bubble size in the product at the outlet, which remains stable in the product. In contrast a conical and radially staggered configuration of the plurality of rotor-and-stator sets, in which each rotor-and-stator set has a larger diameter than the precedent, produces an acceleration of the product stream as it passes through the series of rotor-and-stator sets, reducing the residence time of the product in the mixing apparatus, and causing the shear and cutting forces to substantially increase as the product stream advances through the series of rotor-and-stator sets, which leads to a less efficient gas incorporation, a less homogenous distribution of gas bubbles through the product and making it impossible to produce a product with narrow distribution of gas bubble size, and particularly with uniform and small gas bubble size.

The apparatus 300 has a further inlet 310 positioned in the side wall of the housing 10 between an upstream rotor-stator pair 220 and a downstream rotor-stator pair 240, when considering the flow of product in the apparatus. In an embodiment, a stator spacer ring 314 and a rotor spacer ring 316, both without toothed rims, are arranged to provide an axial distance and consequently an axial space 312 between the upstream rotor-stator pair 220 and the downstream rotor-stator pair 240. In an embodiment, the opening of the further inlet 310 communicates with the axial space 312 between the upstream rotor-stator pair 220 and the downstream rotor-stator pair 240. The axial space is useful to ensure pre-mixing of the additional composition with the food product.

In another embodiment, the apparatus 300 comprises a plurality of further inlets positioned in the side wall of the housing 10, for injecting an additional composition, or several, to be mixed with the food product. For instance, two further inlets are positioned between the same upstream and downstream rotor-stator pairs. Alternatively, a first further inlet is positioned between an upstream rotor-stator pair and an intermediate downstream rotor-stator pair, and a second further inlet is positioned between said intermediate rotor-stator pair and a downstream rotor-stator pair. These two embodiments can be combined. For instance, the apparatus 300 has two, three or four further inlets positioned in the side wall of the housing. One or two further inlets are positioned between a first group of upstream and downstream rotor-stator pairs, and one or two further inlets are positioned between a second group up upstream and downstream rotor-stator pairs. Preferably, when a further inlet is provided between an upstream and a downstream rotor-stator pairs, said rotor-stator pairs are spaced apart with a spacer ring arranged between the upstream rotor-stator pair and the downstream rotor-stator pair.

An advantage of providing several further inlets is that it allows, as will be explained further down, to incorporate several additional compositions, with different final granulometry, depending on the geometry of the respective downstream rotor-stator pairs.

The further inlet 310 is provided for injecting a liquid or semi-liquid additional composition to be mixed into the aerated product flowing from the upstream rotor-stator pair 220. The liquid or semi-liquid additional composition is injected through the second inlet 310 into the axial space 312 and into the aerated food product. This allows for pre-mixing of the additional composition with the aerated food product, prior to a more intense mixing through the downstream rotor-stator pair.

In an embodiment, the liquid or semi-liquid additional composition can be mixed homogeneously into the aerated food product. In another embodiment, the liquid or semi-liquid additional composition can be incorporated into the aerated food product in order to provide a marbled aspect to the final product. In yet another embodiment, the liquid or semi-liquid additional composition is a composition which solidifies shortly after injection into the aerated food product, for instance thanks to cooling of the additional composition.

For instance, the aerated food product is maintained at a low temperature, such as a temperature below 20° C. The additional composition can be a molten chocolate composition, or a liquid caramel composition, at a higher temperature than the temperature of the aerated food product. Due to the difference of temperature, the additional composition cools downs shortly after injection into the aerated food composition, which causes an increase of the viscosity of the additional composition, or even causes the additional composition to solidify. The additional composition and the aerated food product flow together downstream towards the downstream rotor-stator pair 240, and the additional composition breaks downs into particles when flowing through the rotor-stator pair 240. Due to the mixing effect of the rotor-stator pair 240, the particles of additional composition are evenly distributed into the aerated food product, thereby providing a homogeneous aerated food product. In an embodiment, it may be desired to provide particles of several additional compositions. In that case, the apparatus 300 comprises several further inlets, at least one per additional composition to be injected.

In an advantageous embodiment the apparatus has a jacket 320 around the housing 10. The jacket 320 and the housing 10 define a space or vide there-between for circulation of a coolant or heating fluid. The jacket has an inlet 321 and an outlet 322 for circulation of the coolant or heating fluid. Advantageously the use of a jacket permits to maintain the product to be aerated at a desired temperature. In some embodiments a coolant fluid is circulated in the jacket in order to maintain a chilled temperature in the product flowing through the mixing apparatus. The circulation of a coolant fluid makes it possible to prevent the uptake of heat energy that would be generated by the rotation speeds inside the mixing apparatus. Advantageously, this helps to maintain the degree and stability of the aeration in the product. Any coolant or heating fluid may be envisaged. Exemplary coolant fluids include air or water at cold temperature. The temperature of the coolant or heating fluid can be varied dependent on the product to be aerated and the desired aeration properties of the product.

In use product feed stream enters the mixing apparatus through the aperture 101 of the product inlet 100 in the inlet cover 20, into the space 50 upstream relative to the pairs of a rotor and a stator. The product feed stream entering the product inlet 100 is pumped serially through the pairs of a rotor and a stator 210, 220 and exits the mixing apparatus 300 via the product outlet 80. The rotors 222, 223, 224 rotate at high speed relative to the fixed stators 227, 228, 229, providing a high shear rate. Alternatively, the rotors 222, 223, 224 rotate at low speed relative to the fixed stators 227, 228, 229, providing a low shear rate. The rotation speed of the rotors may be selected dependent on the product in question and the desired shear conditions. For example, a typical rotation speed may be from about 50 to 1500 RPM.

Gas entering the mixing apparatus under pressure via the gas injector 1, flows onto the toothed rims of the first pair of a rotor and a stator and is directly subjected to the high shear and cutting forces provided by the toothed pair of a rotor and a stator. The rotation of the rotors in each pair of a rotor and a stator pumps the product stream and the gas bubbles outwardly through the shear gaps between the rotor teeth and the stator teeth, creating a localized high shear condition. High shear forces exerted on the product stream in shear gaps between the rotor teeth and the stator teeth through which fluid flows provides homogenisation of the product stream and the production of a homogenous aeration of the product, with small gas bubbles. The position of the gas injector is important for an efficient incorporation of gas into the product stream, and advantageously produces a very homogenous distribution of gas within the product stream at the product outlet 80, with a substantially uniform gas bubble size. The aerated product exits the mixing apparatus 220 via the cavity 60 and a product outlet 80.

Advantageously the system of the present invention permits to provide aerated products with efficient incorporation of gas into the product base, i.e. very high rates of gas incorporation, otherwise referred to as overrun. For instance the mixing apparatus of the invention allows providing an overrun of over 100%, even over 200% or 300%. Typically overrun of from 10% to 500%, for instance from 20% to 300% can be achieved. This high overrun is achieved whilst also having a homogenous distribution of the gas through the product, and with a narrow distribution of gas bubble size.

The apparatus of the invention is very flexible and allows for "late-differentiation" of the products to manufacture. For instance, it is possible to prepare a common food matrix that is introduced into the apparatus 300 via the product inlet 100. The food matrix flows through the apparatus 300, and gas is injected into the food matrix through the gas injector 1. Then an additional composition is injected into the foamed food matrix through a further inlet 310. By changing the type of the additional composition, it is easy to change the final product using a single food matrix and different additional compositions. In addition, the mix of the food matrix and the additional composition undergoes further mixing when it flows through the rotor-stator pair 240 downstream of the further inlet 310. This further mixing ensure that the final product exhibits a homogeneous bubble size.

In some embodiments the shear rate is varied with longitudinal position along the product flow path. For instance, the shear rate varies proportionately with rotor speed, inversely with rotor/stator gap width, and inversely with angular distance between two teeth of a same row. The rotor/stator gap width is the radial distance between a rotor teeth row and an adjacent stator teeth row. For example, in some embodiments, the shear rate in the first rotor/stator stage is greater than the shear rate in a subsequent stage(s). This may be achieved, for instance, by decreasing the size of the shear gaps between toothed rims of the rotor and stator in subsequent rotor-and-stator sets. Several different shear rates can be present in the apparatus depending on the pairs of a rotor and a stator.

The aerated product stream flows out from the last pair 240 of a rotor and a stator into a cavity 60 and out of the mixing apparatus through the product outlet 80. Advantageously the cavity space 60 contributes to optimizing the expansion and stabilization of the aerated product. The number of pairs of a rotor and a stator and the size of the exit cavity 60 may be varied dependent on the extent of aeration, for instant as measured by % of overrun, if desired. In some embodiments a lower number of pairs of a rotor and a stator, for example one pair of a rotor and a stator, or two pairs of a rotor and a stator and a larger cavity space may be provided. A cavity may be provided alternatively or additionally between two consecutive pairs of a rotor and a stator along the flow direction of the mixing apparatus.

Rotors and stators can be removed and exchanged as modules by first removing either or both of the end covers. Hereby rotors and stators that are suitable for particular operations on particular products can be inserted in the housing 10 according to actual needs. As an example, the rotor spacer ring 316 and the stator spacer ring 314 can be removed and replaced by a pair of a rotor and a stator, and the pairs of a rotor and a stator can have properties such as dimensions, number of teeth and rows of teeth and their distribution and spacing that are optimised for the ingredients and desired properties of the finished product.

Preferably a back-pressure regulator (not illustrated) is provided in the product stream downstream of the product outlet 80 of the mixing apparatus. In some embodiments the back-pressure regulator is in the form of a membrane back pressure valve, for example a double-membrane back-pressure valve. However other suitable back-pressure regulator systems are envisaged. Advantageously the back-pressure regulator allows controlling the pressure in the mixing chamber and ensuring steady flow of the product through the mixing apparatus. If the pressure is too low the degree of aeration (overrun) may be reduced as the product base will be unable to hold the aeration. If, however, the pressure is too high the gas may be squeezed out of the product, again resulting in a reduced degree of aeration. The desired pressure in the chamber will depend amongst others on the product to be aerated and the desired degree of aeration. For instance, in general the working pressure in the mixing apparatus is typically from about 0.5 to about 15 bars.

The mixing apparatus of the invention may advantageously be used for the aeration of liquid and semi-liquid products in a wide variety of applications, for example in the food or cosmetic industries. Particular applications are for the aeration of liquid and semi-liquid foodstuffs, for instance in the aeration of dairy products, confectionery, ice-cream or other liquid and semi-liquid foodstuffs, where examples of the injected liquid or semi-liquid additional composition include caramel and chocolate at an elevated temperature where such additional compositions can be injected and are cooled by the aerated product to form solid particles. The downstream rotor-stator pair will then crush or comminute the additional composition e.g. to form a granulate with particles, grains or chips in the aerated product.

In other embodiment the invention provides a method of aerating a liquid or semi-liquid product, preferably a foodstuff, using a mixing apparatus as described herein-above. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, and so forth). Use of broader terms such as comprises, includes, having, etc. should be understood to provide support for narrower terms such as consisting of, consisting essentially of, comprised substantially of, and the like.

It should be noted that embodiments and features described in the context of one of the aspects or embodiments of the present invention also apply to the other aspects or embodiments of the invention.

The invention claimed is:

1. An apparatus for aerating a food product, the apparatus comprising:
   a tubular housing with an inlet for the food product to be aerated and an outlet for the aerated food product, and, within the tubular housing, a plurality of pairs of a rotor and a stator, wherein each pair of the rotor and the stator has complementary toothed rims orientated in opposition in the axial direction;
   a gas injector for injecting, at an upstream position relative to a first pair of a first rotor and a first stator, a gas in the food product to be aerated; and
   wherein a further inlet is provided for injecting, at a position between an upstream pair of an upstream rotor and an upstream stator and an adjacent downstream pair of a downstream rotor and a downstream stator, an additional composition to be mixed with the food product, and
   wherein a stator ring and a rotor ring are arranged between the upstream pair of the upstream rotor and the upstream stator and the downstream pair of the downstream stator and the downstream rotor to provide an axial space between the upstream pair of the upstream rotor and the upstream stator and the downstream pair of the downstream stator and the downstream rotor, and the further inlet is arranged to inject the additional composition to be mixed with the food product into the axial space.

2. The apparatus according to claim 1 wherein each rotor and each stator in the plurality of pairs of the rotor and the stator can be removed and exchanged.

3. The apparatus according to claim 1, wherein the upstream pair of the upstream rotor and the upstream stator is downstream of the first pair of the first stator and the first rotor.

4. The apparatus according to claim 1, wherein each rotor of each pair of the rotor and the stator is coupled to a drive shaft, and each stators of each pair of the rotor and the stator is coupled to the housing.

5. The apparatus according to claim 1, wherein at least one pair of a rotor and a stator in the plurality of pairs of the rotor and the stator has at least two rows of opposed toothed rims.

6. The apparatus according to claim 1, wherein a gas outlet of the injector is located proximate an inner toothed rim of the first pair of the first rotor and the first stator.

7. The apparatus according to claim 1, wherein the gas injector is inclined relative to the axial direction of the tubular housing.

8. The apparatus according to claim 1, comprising more than one gas injector.

9. The apparatus according to claim 1, comprising a jacket surrounding at least a portion of the tubular housing, the jacket having an inlet and an outlet for a heating or cooling fluid.

10. The apparatus according to claim 1, comprising a back-pressure regulator arranged in a flow path of the food product downstream of the mixing apparatus.

11. The apparatus according to claim 1, wherein the plurality of pairs of the rotor and the stator comprises at least three pairs of the stator and the rotor and no more than eight pairs of the stator and the rotor.

12. The apparatus according to claim 1, comprising a plurality of further inlets for injecting an additional composition, or several additional compositions, to be mixed with the food product.

13. A method of preparing an aerated food product, the method comprising:
    passing a stream of food product to be aerated through an apparatus, the apparatus comprising:
       a housing with an inlet for the food product to be aerated and an outlet for the aerated food product, and, within the housing, a plurality of pairs of a rotor and a stator, where each pair of the rotor and the stator has complementary toothed rims orientated in opposition in the axial direction;
a gas injector for injecting, at an upstream position relative to a first pair of a first rotor and a first stator, a gas in the food product to be aerated; and
wherein a further inlet is provided for injecting, at a position between an upstream pair of an upstream rotor and an upstream stator and an adjacent downstream pair of a downstream rotor and a downstream stator, an additional composition to be mixed with the food product, and
wherein a stator ring and a rotor ring are arranged between the upstream pair of the upstream rotor and the upstream stator and the downstream pair of the downstream stator and the downstream rotor to provide an axial space between the upstream pair of the upstream rotor and the upstream stator and the downstream pair of the downstream stator and the downstream rotor, and the further inlet is arranged to inject the additional composition to be mixed with the food product into the axial space;
injecting via the gas injector a gas into the food product stream at an upstream position relative to the first pair of a rotor and a stator; and
injecting an additional composition to be mixed with the food product through the further inlet at a position between an upstream pair of a rotor and a stator and an adjacent downstream pair of a rotor and a stator, into an axial space provided between the upstream pair of a rotor and a stator and the adjacent downstream pair of a rotor and a stator.

* * * * *